(12) United States Patent
Haskew et al.

(10) Patent No.: US 10,169,976 B2
(45) Date of Patent: Jan. 1, 2019

(54) VEHICLE OCCUPANT DETECTION SYSTEM

(71) Applicant: The Board of Trustees of The University of Alabama, Tuscaloosa, AL (US)

(72) Inventors: Timothy Austin Haskew, Northport, AL (US); Edward Sazonov, Northport, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 15/480,912

(22) Filed: Apr. 6, 2017

(65) Prior Publication Data

US 2017/0294100 A1    Oct. 12, 2017

Related U.S. Application Data

(60) Provisional application No. 62/319,836, filed on Apr. 8, 2016.

(51) Int. Cl.
| | | |
|---|---|---|
| *B60Q 1/00* | (2006.01) | |
| *G08B 21/14* | (2006.01) | |
| *B60C 9/00* | (2006.01) | |

(52) U.S. Cl.
CPC ............ *G08B 21/14* (2013.01); *B60C 9/00* (2013.01)

(58) Field of Classification Search
CPC ............................ G60R 1/00; G06Q 10/00
See application file for complete search history.

(56) References Cited

U.S. PATENT DOCUMENTS

| | | | | |
|---|---|---|---|---|
| 6,424,267 | B1 | 7/2002 | Schell | |
| 2008/0292146 | A1* | 11/2008 | Breed | B60N 2/002 382/118 |
| 2013/0325323 | A1* | 12/2013 | Breed | G01C 21/34 701/420 |
| 2016/0103111 | A1* | 4/2016 | Griffin | G01N 33/0067 73/25.01 |
| 2017/0182939 | A1* | 6/2017 | Phatak | B60Q 9/00 |

OTHER PUBLICATIONS

Jung, Heejung, Modeling CO2 Concentrations in Vehicle Cabin, SAE International, paper 2013-01-1497, Apr. 8, 2011.
Null, Jan, Heatstroke Deaths of Children in Vehicles, Department of Meteorology and Climate Science, San Jose State University, noheatstroke.org., 5 pages, website updated Mar. 30, 2016, accessed Apr. 6, 2017.

* cited by examiner

*Primary Examiner* — Shirley Lu
(74) *Attorney, Agent, or Firm* — Meunier Carlin & Curfman LLC

(57) ABSTRACT

Various implementations of an occupant detection system may be used in a vehicle to detect the presence of a living occupant (human or otherwise) and generate a warning. The warning may be communicated to another person(s) or to other vehicle systems to alert people in the vicinity of the vehicle. The system prevents injury and death to people and pets that may be accidentally within a parked car and unable to egress. The system may be integrated into a new vehicle or housed in a separate device that can be plugged into a power outlet within the vehicle.

19 Claims, 2 Drawing Sheets

VEHICLE OCCUPANT DETECTION SYSTEM

CROSS REFERENCE TO RELATED APPLICATIONS

This application claims priority to U.S. patent application Ser. No. 62/319,836, entitled "Vehicle Occupant Detection System," filed Apr. 8, 2016, the content of which is herein incorporated by reference in its entirety.

BACKGROUND

Since 1998, 637 children have died as a result of heatstroke within a parked car. The annual average number of such deaths is 37. The breakdown of these incidents shows that 53% occur because the child is forgotten, and 29% occur because a child enters an unattended vehicle and can't get out.

Currently available occupant detection systems may include pressure sensors in seats or motion detection systems, but pressure sensor based systems may not be able to detect the presence of pets in the vehicle or children that may not be on the seat or of sufficient weight. The motion detection systems may not be able to detect the presence of pets or children that are sleeping or not within the field of view of the motion detection system.

Accordingly, systems and methods for detecting the presence of a vehicle occupant within a vehicle are needed.

BRIEF SUMMARY

Various implementations of the invention may be used in a vehicle to detect the presence of a living occupant (human or otherwise) and generate a warning. The warning may be communicated to another person(s) or to other vehicle systems to alert people in the vicinity of the vehicle. The system prevents injury and death to people and pets that may be accidentally within a parked vehicle and unable to get out of the vehicle.

According to various implementations, an occupant detection system within a vehicle includes an electrical signal sensor, an accelerometer, a carbon dioxide sensor, and a processor in communication with a memory. The processor executes computer-readable instructions stored on the memory, and the instructions cause the processor to receive a first signal from the electrical signal sensor indicating whether power to the vehicle is on or off, a second signal from the accelerometer indicating whether the vehicle is in motion, and a third signal from the carbon dioxide sensor associated with a concentration of carbon dioxide in a cabin of the vehicle. In response to the first signal indicating that the power is off and the second signal indicating that the vehicle is not in motion, the instructions cause the processor to compare a rate of change of the data associated with the third signal with a threshold level of an expected rate of change of carbon dioxide concentration within the vehicle. And, in response to the rate of change of the data associated with the third signal exceeding the threshold level, the instructions cause the processor to generate and communicate an alarm signal.

In some implementations, the instructions cause the processor to store data associated with the third signal in the memory at a first time interval periodically in response to the first signal indicating that the power is on or the second signal indicating that the vehicle is in motion. The data associated with the third signal corresponds to a carbon dioxide concentration within the vehicle. In response to the first signal indicating that the power is off and the second signal indicating that the vehicle is not in motion, the instructions cause the processor to store the data associated with the third signal in the memory at a second time interval periodically. The second time interval is more frequent than the first time interval.

The instructions may also cause the processor to compare the data associated with the third signal with a threshold level of carbon dioxide concentration within the vehicle, and in response to the data associated with the third signal exceeding the threshold level of carbon dioxide concentration, generate and communicate the alarm signal.

The occupant detection system may also include a temperature sensor for detecting a temperature in the vehicle, according to some implementations. The instructions further cause the processor to receive a fourth signal from the temperature sensor. The fourth signal is associated with the temperature in the vehicle. The threshold level of an expected rate of change of the carbon dioxide concentrations includes a first threshold level in response to the fourth signal indicating that the temperature in the vehicle is within a first temperature range and a second threshold level in response to the fourth signal indicating that the temperature in the vehicle is within a second temperature range. For example, the first threshold level may be lower than the second threshold level and the first temperature range is higher than the second temperature range. In addition, the second time interval may decrease in response to the fourth signal indicating that the temperature in the vehicle exceeds a pre-defined temperature threshold.

In some implementations, the electrical signal sensor, the accelerometer, the carbon dioxide sensor, and the processor are disposed in a housing. The housing may include a plug for engaging a plug receptacle within a cabin of the vehicle, according to one implementation.

In some implementations, the processor is in electrical communication with an on-board diagnostic computing system in the vehicle.

In some implementations, the system further includes a cellular modem, and the alarm signal may be communicated to a cellular device, such as a cellular phone or tablet, via the cellular modem.

In some implementations, the occupant detection system further includes a local area network communication device, and the alarm signal may be communicated to a computing device disposed outside of the vehicle via the local area network communication device.

In some implementations, the instructions further cause the processor to communicate with a communication bus of the vehicle, and the alarm signal includes an instruction to open at least one door and/or window of the vehicle, turn on an air conditioning system of the vehicle, turn on the vehicle, communicate with an on-board communication system, sound a horn of the vehicle, and/or flash headlights of the vehicle.

According to other various implementations, an occupant detection system within a vehicle includes an electrical signal sensor, an accelerometer, a carbon dioxide sensor, and a processor in communication with a memory. The processor executes computer-readable instructions stored on the memory, and the instructions cause the processor to: (1) receive a first signal from the electrical signal sensor indicating whether power to the vehicle is on or off, a second signal from the accelerometer indicating whether the vehicle is in motion, and a third signal from the carbon dioxide sensor indicating a concentration of carbon dioxide in a cabin of the vehicle, (2) in response to the first signal indicating that the power is off and the second signal indicating that the vehicle is not in motion, compare the data associated with the third signal with a threshold level of expected carbon dioxide concentration within the vehicle, and (3) in response to the data associated with the third signal exceeding the threshold level, generate and communicate an alarm signal.

In some implementations, the instructions may cause the processor to store data associated with the third signal in the memory at a first time interval periodically in response to the first signal indicating that the power is on or the second signal indicating that the vehicle is in motion. The data associated with the third signal corresponds to a carbon dioxide concentration. In addition, the instructions may cause the processor to store the data associated with the third signal in the memory at a second time interval periodically in response to the first signal indicating that the power is off and the second signal indicating that the vehicle is not in motion. The second time interval may be more frequent than the first time interval.

In some implementations, the data associated with the third signal includes an absolute value of the data. The instructions may further cause the processor to compare a rate of change of the data associated with the third signal with a threshold level of an expected rate of change of carbon dioxide concentration within the vehicle, and in response to the rate of change data associated with the third signal exceeding the threshold level of expected rate of change of carbon dioxide concentration, generate and communicate the alarm signal.

BRIEF DESCRIPTION OF THE DRAWINGS

The components in the drawings are not necessarily to scale relative to each other. Like reference numerals designate corresponding parts throughout the several views.

DETAILED DESCRIPTION

Various implementations of an occupant detection system may be used in a vehicle to detect the presence of a living occupant (human or otherwise) and generate a warning. The warning may be communicated to another person(s) or to other vehicle systems to alert people in the vicinity of the vehicle. The system prevents injury and death to people and pets that may be accidentally within a parked car and unable to get out of the vehicle. The system may be integrated into a newly designed vehicle or housed in a separate device that can be plugged into a power outlet within a cabin of the vehicle.

The system is based on the detection of carbon dioxide, which naturally occurs as living creatures exhale. In a confined space with poor or without ventilation, carbon dioxide levels rise when a living creature is present within the space. Previous research has shown a linear increase in carbon dioxide concentration in an unventilated vehicle at rest. With ventilation and when moving, the carbon dioxide level has an exponential increase and reaches a steady-state value. The time derivative of the carbon dioxide levels increases are dependent on number of passengers, breathing rate, carbon dioxide concentration in the expiration, and the volume of the cabin. By combining data that determines whether the vehicle is parked with data regarding temperature and carbon dioxide level rates of change, a determination about the presence of an occupant in a parked vehicle may be made.

Figure 1:
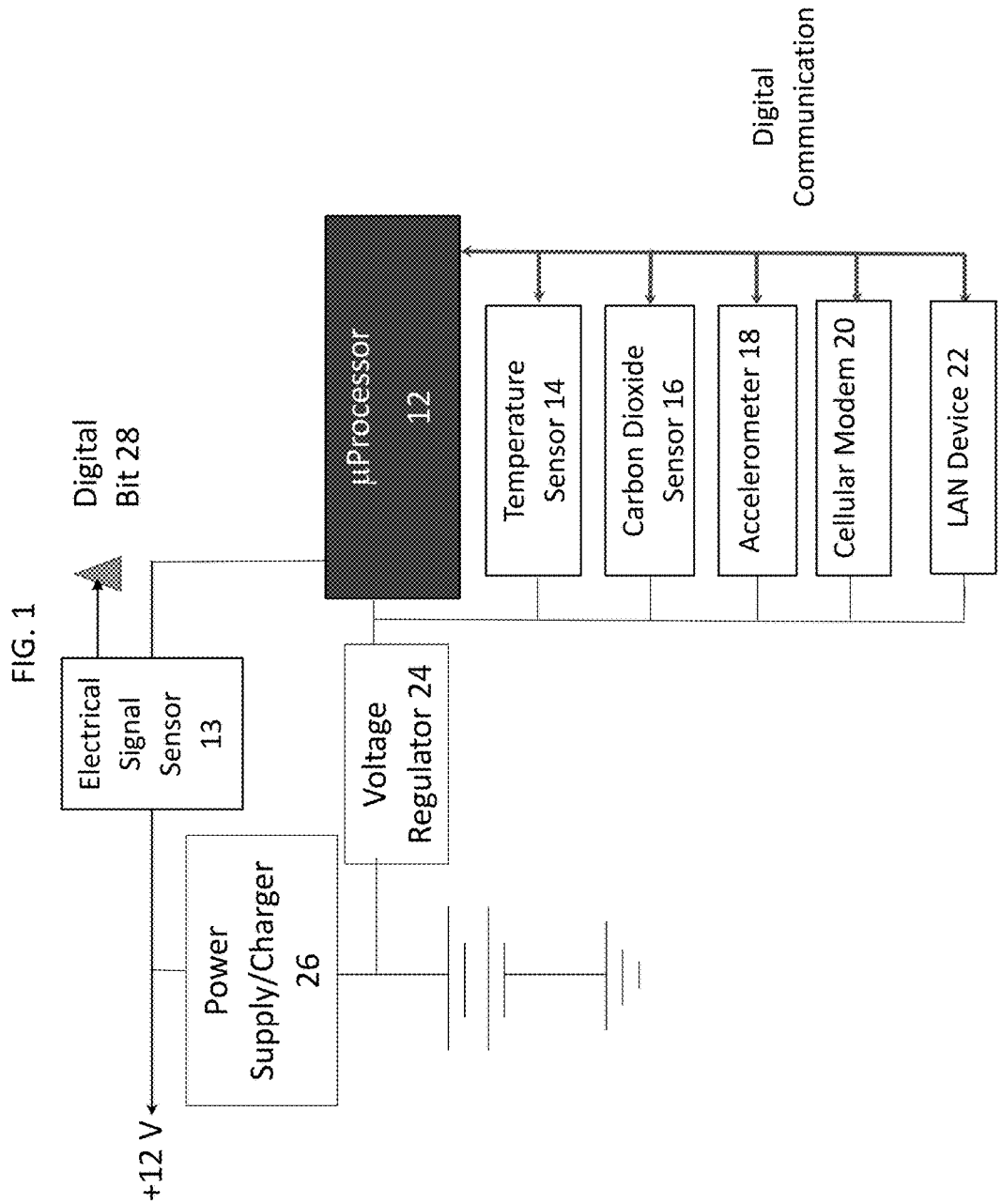
FIG. 1 illustrates a block diagram of the occupant detection system according to one implementation.

An exemplary block diagram of the system is provided in FIG. 1. As shown in FIG. 1, the system 10 includes a microprocessor 12 that is in electrical communication (e.g., digital communication) with a temperature sensor 14, a carbon dioxide sensor 16, an accelerometer 18, and one or more communication devices. The communication devices may include a cellular modem 20 and/or a local area network device 22, such as a Bluetooth™ device. In addition, the system 10 may also detect whether the vehicle power is on or off using an electrical signal sensor 13. For example, if the vehicle is on, then the system 10 receives 12V from the vehicle. And, if the vehicle is switched off, the 12V is not present. The temperature sensor 14 detects a temperature within the cabin of the vehicle, the carbon dioxide sensor 16 detects carbon dioxide levels within the cabin of the vehicle, and the accelerometer 18 detects whether the vehicle is in motion.

Signals from the sensors 14, 16, and 18 are received by the microprocessor 12, and the microprocessor 12 communicates with the sensors 14, 16, 18 regarding the frequency for signal collection, the time period for storing the received signals, and/or operation modes related to the received signals. In the implementation of FIG. 1, microprocessor 12 is in electrical communication with a voltage regulator 24, which is in electrical communication with a power supply 26. And, the microprocessor 12 is in direct electrical communication with the power supply 26 via a digital bit 28.

Figure 2:
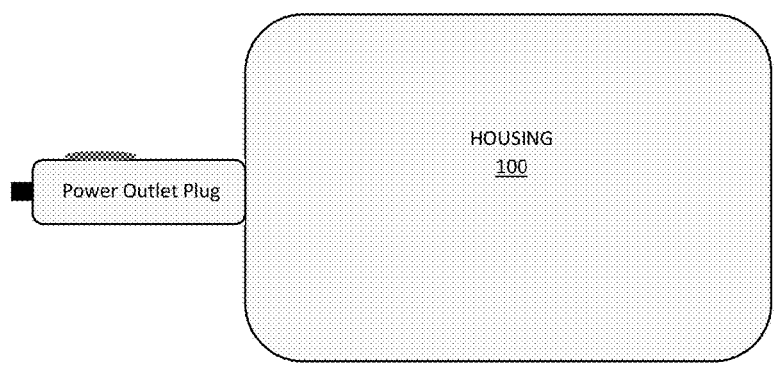
FIG. 2 illustrates a schematic of a housing that includes components of the occupant detection system, according to one implementation.
Figure 3:
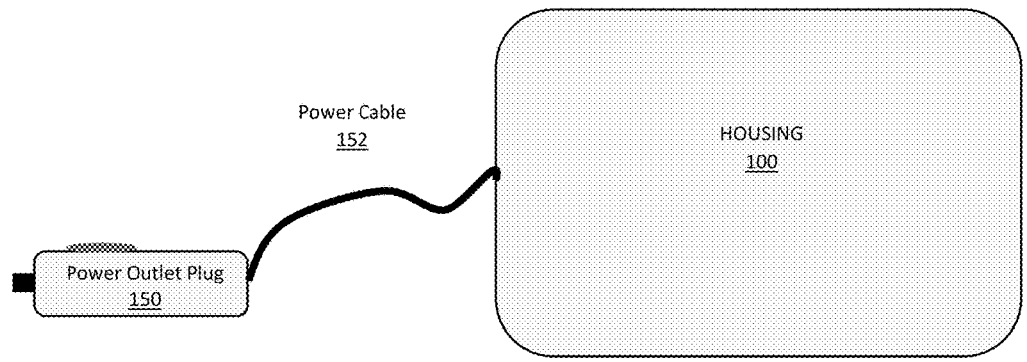
FIG. 3 illustrates a schematic of a housing and power outlet plug having a power cable extending between them, according to one implementation.

In some implementations, such as the implementation shown in FIGS. 2 and 3, the components of the system shown in FIG. 1 are disposed within a housing 100. The housing 100 shown in FIG. 2 is physically and electrically coupled with a power outlet plug 150 for plugging into an electrical outlet or receptacle within the cabin of the vehicle. The housing 100 shown in FIG. 3 is electrically coupled to a power outlet plug 150 via power cable 152, but it is not physically coupled to the plug 150. These implementations allow the system to be used in any vehicle.

In other implementations, one or more of the components shown in FIG. 1 are integrated into the vehicle during the design phase. For example, in some implementations, the accelerometer, electrical signal sensor, carbon dioxide sensor, and/or temperature sensor are installed in the vehicle, and the microprocessor receives signals from these sensors via the vehicle communication bus. For example, in certain implementations, the microprocessor is part of or configured for communicating with an on board diagnostics system (OBDII) of the vehicle, which receives signals from these sensors. Alternatively or additionally, the system is configured for receiving a signal from the OBDII that the vehicle is parked. The microprocessor determines whether the vehicle is parked and off, monitors carbon dioxide and/or temperature rise levels according to the modes described above, and communicates messages to other vehicle systems or an external computing device in response to the system detecting carbon dioxide and/or temperature rise levels exceeding the preset thresholds.

In general, the microprocessor 12 receives signals from the sensors 14, 16, and 18 and identifies an operation mode for the system. According to certain implementations, the operation modes include: a transport mode, a monitor mode, and an alarm mode. The system operates in transport mode in response to detecting that power is being supplied to the vehicle and/or the vehicle is in motion. In the transport mode, the carbon dioxide sensor 16 and the temperature sensor 14 sample carbon dioxide levels and temperature, respectfully, within the cabin of the vehicle at a first frequency, such as, for example, every minute. In some implementations, this information is stored on a first in, first out basis for a certain time period, such as, for example, five minutes. In other implementations, the first frequency and/or time for storage may be decreased or increased. In some implementations, an absolute value of the data is stored.

The system enters the monitor mode in response to detecting that the vehicle power is off and the vehicle is not in motion, such as when the vehicle is parked. Having the system detect both markers allows the system to remain in transport mode when the vehicle has power but is motionless or when the system is not receiving an electrical signal from the vehicle but the vehicle is moving. The latter situation occurs, for example, when components of the system are disposed within a housing, such as housing 100 shown in FIGS. 2 and 3, and the power outlet plug is unplugged from the plug receptacle within the cabin of the vehicle. In monitor mode, the system samples carbon dioxide levels and temperature at a second frequency that is higher than the first frequency. For example, the second frequency may be about every 30 seconds. In some implementations, this information is stored for an unlimited time period or for another discrete time period, which can be the same or different from the time period of storage in the transport mode.

The system enters the alarm mode in response to detecting that a rate of increase in the carbon dioxide levels exceeds a first predetermined carbon dioxide threshold. The system also enters the alarm mode if the rate of increase in carbon dioxide levels exceeds a second predetermined carbon dioxide threshold, which is lower than the first predetermined carbon dioxide threshold, and the temperature (or rate of temperature rise) exceeds a predetermined temperature threshold according to some implementations. In alternative implementations, the absolute values, rather than rate of change, of carbon dioxide concentration and temperature, are used to determine when to enter the alarm mode. When in alarm mode, the system generates an alarm signal to alert another person or people within the vicinity of the vehicle that there is an occupant within the vehicle. For example, the alarm signal causes a vehicle alarm to sound, or the alarm signal causes a visual, audible, and/or vibro-tactile message to be communicated to a user of a mobile communication device of a designated person(s). Alternatively or in addition to the above, the alarm signal may cause a message to be communicated to emergency personnel or emergency vehicle service provider. Alternatively or in addition to the above, the alarm signal may cause a response from one or more other vehicle systems, such as lowering one or more windows, opening or unlocking one or more doors, turning on the power, the air conditioning system, communication with an on-board communication system, sounding the horn, and/or flashing headlights.

Signals communicated from the system via the local area network device 22 and cellular modem 20 include, for example, warning messages or information about the carbon dioxide and/or temperature levels within the vehicle, according to some implementations. For example, the alarm signal may cause the portable computing device or cellular device to generate an audible, visual, and/or vibro-tactile warning message to the user.

Furthermore, in some implementations, the system includes hardware or software installed on a vehicle operator's portable computing device or computing device for communicating with the vehicle-side communication device(s), such as device 22 or modem 20, of the system. The hardware or software can be configured for receiving a telephone call, a text message, and/or another alarm feedback response, such as audible, visual, and/or vibro-tactile feedback. In addition, the hardware or software on the portable computing device or computing device may be used by an operator to select feedback preferences and/or input phone numbers to call and/or text in response to the system entering the alarm mode.

The devices recited in the appended claims are not limited in scope by the specific devices and methods of using the same described herein, which are intended as illustrations of a few aspects of the claims. Any devices or methods that are functionally equivalent are intended to fall within the scope of the claims.

Various modifications of the devices and methods in addition to those shown and described herein are intended to fall within the scope of the appended claims. Further, while only certain representative devices and method steps disclosed herein are specifically described, other combinations of the devices and method steps are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Those skilled in the art who review this disclosure will readily appreciate that many modifications are possible (e.g., variations in sizes, dimensions, structures, shapes and proportions of the various elements, values of parameters, mounting or layering arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An occupant detection system within a vehicle comprising:
   an electrical signal sensor;
   an accelerometer;
   a carbon dioxide sensor; and
   a processor in communication with a memory, wherein the processor executes computer-readable instructions stored on the memory, said instructions cause the processor to:

receive a first signal from the electrical signal sensor indicating whether power to the vehicle is on or off, receive a second signal from the accelerometer indicating whether the vehicle is in motion, and receive a third signal from the carbon dioxide sensor associated with a concentration of carbon dioxide in a cabin of the vehicle, in response to the first signal indicating that the power is on or the second signal indicating that the vehicle is in motion, store data associated with the third signal in the memory at a first time interval periodically, in response to the first signal indicating that the power is off and the second signal indicating that the vehicle is not in motion, compare a rate of change of the data associated with the third signal with a threshold level of an expected rate of change of carbon dioxide concentration within the cabin of the vehicle and store the data associated with the third signal in the memory at a second time interval periodically, wherein the second time interval is more frequent than the first time interval, and in response to the rate of change of the data associated with the third signal exceeding the threshold level, generate and communicate an alarm signal.

2. The occupant detection system of claim 1, wherein the instructions further cause the processor to compare the data associated with the third signal with a threshold level of carbon dioxide concentration within the vehicle, and in response to the data associated with the third signal exceeding the threshold level of carbon dioxide concentration, generate and communicate the alarm signal.

3. An occupant detection system within a vehicle comprising:

an electrical signal sensor;
an accelerometer;
a temperature sensor for detecting a temperature in the vehicle;
a carbon dioxide sensor; and
a processor in communication with a memory, wherein the processor executes computer-readable instructions stored on the memory, said instructions cause the processor to:

receive a first signal from the electrical signal sensor indicating whether power to the vehicle is on or off, receive a second signal from the accelerometer indicating whether the vehicle is in motion, receive a third signal from the carbon dioxide sensor associated with a concentration of carbon dioxide in a cabin of the vehicle, and receive a fourth signal from the temperature sensor, the fourth signal being associated with the temperature in the vehicle, in response to the first signal indicating that the power is off and the second signal indicating that the vehicle is not in motion, compare a rate of change of the data associated with the third signal with a first threshold level of an expected rate of change of the carbon dioxide concentrations within the cabin of the vehicle in response to the fourth signal indicating that the temperature in the vehicle is within a first temperature range and compare the rate of change of the data associated with the third signal with a second threshold level of the expected rate of change of carbon dioxide concentration within the cabin of the vehicle in response to the fourth signal indicating that the temperature in the vehicle is within a second temperature range, and in response to the rate of change of the data associated with the third signal exceeding the first threshold level or the second threshold level, generate and communicate an alarm signal.

4. The occupant detection system of claim 3, wherein the first threshold level is lower than the second threshold level and the first temperature range is higher than the second temperature range.

5. The occupant detection system of claim 4, wherein the second time interval decreases in response to the fourth signal indicating that the temperature in the vehicle exceeds a pre-defined temperature threshold.

6. The occupant detection system of claim 1, wherein the electrical signal sensor, the accelerometer, the carbon dioxide sensor, and the processor are disposed in a housing, the housing comprising a plug for engaging a plug receptacle within a cabin of the vehicle.

7. The occupant detection system of claim 1, wherein the processor is in electrical communication with an on-board diagnostic computing system in the vehicle.

8. The occupant detection system of claim 1, further comprising a cellular modem, and wherein the cellular modem is for communicating the alarm signal to a cellular device over a wireless communication network.

9. The occupant detection system of claim 1, further comprising a local area network communication device, and wherein the local area network communication device is for communicating the alarm signal to a computing device disposed outside of the vehicle over a wireless communication network.

10. The occupant detection system of claim 1, wherein the instructions further cause the processor to communicate with a communication bus of the vehicle, and the alarm signal comprises an instruction to open at least one door of the vehicle.

11. The occupant detection system of claim 1, wherein the instructions further cause the processor to communicate with a communication bus of the vehicle, and the alarm signal comprises an instruction to open at least one window of the vehicle.

12. The occupant detection system of claim 1, wherein the instructions further cause the processor to communicate with a communication bus of the vehicle, and the alarm signal comprises an instruction to turn on an air conditioning system of the vehicle.

13. The occupant detection system of claim 1, wherein the instructions further cause the processor to communicate with a communication bus of the vehicle, and the alarm signal comprises an instruction to turn on the vehicle.

14. The occupant detection system of claim 1, wherein the instructions further cause the processor to communicate with a communication bus of the vehicle, and the alarm signal comprises an instruction to communicate with an on-board communication system.

15. The occupant detection system of claim 1, wherein the instructions further cause the processor to communicate with a communication bus of the vehicle, and the alarm signal comprises an instruction to sound a horn of the vehicle.

16. The occupant detection system of claim 1, wherein the instructions further cause the processor to communicate with a communication bus of the vehicle, and the alarm signal comprises an instruction to flash headlights of the vehicle.

17. An occupant detection system within a vehicle comprising:

an electrical signal sensor;
an accelerometer;
a carbon dioxide sensor; and a processor in communication with a memory, wherein the processor executes computer-readable instructions stored on the memory, said instructions cause the processor to:
  receive a first signal from the electrical signal sensor indicating whether power to the vehicle is on or off, receive a second signal from the accelerometer indicating whether the vehicle is in motion, and receive a third signal from the carbon dioxide sensor associated with a concentration of carbon dioxide in a cabin of the vehicle,
  in response to the first signal indicating that the power is on or the second signal indicating that the vehicle is in motion, store data associated with the third signal in the memory at a first time interval periodically,
  in response to the first signal indicating that the power is off and the second signal indicating that the vehicle is not in motion, compare the data associated with the third signal with a threshold level of expected carbon dioxide concentration within a cabin of the vehicle and store the data associated with the third signal in the memory at a second time interval periodically, wherein the second time interval is more frequent than the first time interval, and
  in response to the data associated with the third signal exceeding the threshold level, generate and communicate an alarm signal.

18. The occupant detection system of claim 17, wherein the data associated with the third signal comprises an absolute value of the data.

19. The occupant detection system of claim 17, wherein the data associated with the third signal comprises a rate of change of the data associated with the third signal, and the threshold level of expected carbon dioxide concentration comprises an expected rate of change of carbon dioxide concentration within the cabin of the vehicle.

* * * * *